Patented Dec. 28, 1948

2,457,585

UNITED STATES PATENT OFFICE 2,457,585

METHOD OF PRODUCING PENICILLINS

Robert B. McCormack, Milltown, N. J., assignor to E. R. Squibb & Sons, New York, N. Y., a corporation of New York No Drawing. Application June 10, 1944,
Serial No. 539,797

3 Claims. (Cl. 195—81)

This invention relates to the production of penicillins, the antimicrobial agents which have been found exceptionally effective as therapeutics. These antimicrobial agents have been produced by growing a penicillin-forming mold, especially *Penicillium notatum*, on the surface of a liquid nutrient medium, or (advantageously) by growing the mold in submerged culture, i. e., by incubating the mold while it is submerged in a liquid nutrient medium and the latter is aerated, by agitation or otherwise.

In the production by submerged culture, there has been included as a component of the medium a complex organic mixture of nitrogenous substances—especially corn steep liquor—for the purpose of increasing the efficiency of penicillin production (Foster and McDaniel application, Ser. No. 487,140, filed May 15, 1943, now Patent No. 2,448,790, issued September 7, 1948). It has been found recently that this component is responsible for the production of a particular penicillin, which has been named penicillin G (Wintersteiner and MacPhillamy application, Serial No. 540,140, filed June 13, 1944), and that when an inorganic, water-soluble sulfite-type compound—e. g., sodium sulfite—is included in place of the corn steep liquor, a different penicillin is obtained, which has been named penicillin F (McCormack application Serial No. 519,207, filed January 21, 1944, now Patent No. 2,437,918, dated March 15, 1948; and Wintersteiner and Adler application Ser. No. 540,543, filed June 15, 1944).

It is the object of this invention to provide other methods of and media for producing penicillins by mold growth.

It has been found that penicillins can be efficiently produced by growing a penicillin-forming mold on a sterile, solid substrate essentially comprising moist, discrete units of a nutrient material of the group consisting of seeds and seed-processing products, especially grain. Thus, oats, with just sufficient water to moisten, constitute, after sterilization (e. g., by autoclaving), an excellent medium or substrate for the growth of *Penicillium notatum*.

The seed and seed-processing products utilizable for the purpose of this invention include, inter alia, oats, wheat, maize, rice, millet, rye, barley, clover seed, beans, peas, bran, oat hulls, hominy, and cracker wheat.

Using the water added to the grain in preparing the substrate as a carrier, there may be added one or more of the substances heretofore included in liquid nutrient media, for the production of penicillin, inter alia: nutrient salts supplying potassium, phosphorus, magnesium, calcium and nitrogen (e. g., sodium nitrate, potassium dihydrogen phosphate, magnesium sulfate, calcium carbonate, tricalcium phosphate, sodium tartrate, sodium citrate, and ammonium tartrate); ferrous sulfate; zinc sulfate; sugars (e. g., brown sugar, glucose, sucrose, and molasses); complex organic mixtures of nitrogenous substances (e. g., corn steep liquor, yeast extract, whiskey slop, casein hydrolysate, and Penicillium autolysate); urea; glycerol; and inorganic, water-soluble sulfite-type compounds (e. g., sodium sulfite, sodium bisulfite, sodium thiosulfate and sodium metabisulfite). Particularly advantageous is the addition of calcium carbonate and/or sodium citrate.

The substrate of this invention may be employed for the production of penicillins by either "static" culture or "agitated" culture, with or without an additional air supply. In the "static" culture, it is advantageous to shake up the substrate during the inoculation (to facilitate the spreading of the inoculum through the substrate), and to use a relatively small amount of the substrate in a large container, preferably in a container so shaped as to maximize the surface of substrate exposed to the air. After mycelial growth is well established (usually after 4 days), sporulation over the surface of the moist discrete units of the substrate is profuse, with efficient production of the penicillin. Advantageously, the aeration of the units of the substrate is increased by forcing sterile air through the substrate.

The "agitated" culture may be effected by any suitable mechanical arrangement for redistributing the units of the substrate so as to expose each unit to the controlled atmosphere (i. e., sterile air of controlled temperature and humidity). With the moisture content of the substrate just sufficient to moisten the units and maintain growth of the mold, substantially no "free" water is present, and mere rotation of the container on a horizontal axis will provide excellent redistribution of the units, with each unit of the substrate in continual motion. Advantageously, aeration is increased by passing in sterile air and/or increasing the pressure.

In the production by either "static" or agitated" culture, the essential moisture may be supplied either in whole or in part by appropriately adjusting the humidity of the air supply.

After maximum potency has been developed, the substrate (preferably after maceration of the substrate units) is transferred to water or other suitable solvent (e. g., amyl acetate) and thoroughly mixed therewith; the solid matter is then removed from the mixture (as by filtration or centrifugation); and the clear penicillin-containing liquid is treated by procedures well known in the art for recovery of a purified sodium-penicillin (e. g., in the case of initial extraction with water, by acidifying the filtrate, and extracting it with amyl acetate in the cold; extracting the amyl-acetate solution with a pH 6.5 phosphate-buffer solution; extracting the cooled and acidified buffer solution with chloroform; extracting the chloroform solution with a pH 6.0 phosphate-buffer solution; extracting the cooled and acidified buffer solution with ether; extracting the ether solution with sodium bicarbonate solution, and freezing the resulting solution and subjecting it to a high vacuum to sublime out the water). The solid matter removed, especially if the substrate units have not been macerated, may be re-used for the production of penicillins, i. e., sterilized by autoclaving and re-inoculated with a penicillin-forming mold.

The following examples are illustrative of the invention (the potency unit referred to being the Florey, or Oxford, unit used in the United States of America for standardizing therapeutic penicillin preparations; and the identification of the strains being that given by the Northern Regional Research Laboratory at Peoria, Illinois):

Example 1

50 g. oats in a 250 cc. flask is moistened with 50 cc. water; and the flask is sterilized by autoclaving, inoculated with a spore suspension of deep-culture strain No. 832 of *Penicillium notatum*, and incubated at 75° F. A maximum potency of 24 units/g. is developed in 5 days, the pH being 6.2. (The potencies given in this and the following examples were determined by macerating a 4 g. sample of the incubated substrate in a mortar, transferring the macerated substrate to 36 cc. water, thoroughly shaking the mixture, removing the solid matter by filtration through paper supporting Lloyd's reagent or by centrifuging, passing the clear liquid obtained through a Seitz filter, and assaying the filtrate; and the pH given in this and the following examples is the pH of a macerated 4 g. sample in 36 cc. water.)

Example 2

With 0.5 g. $CaCO_3$ included in the medium of Example 1, and under the same conditions, a maximum potency of 36 units/g. is developed in 4 days, the pH being 6.7. (Another peak titer, 42 units/g. with a pH of 7.0, is developed in 11 days, probably as the result of secondary growth initiated by spores produced on the fourth and fifth days.)

Example 3

Using a substrate composed of 40 g. wheat, 60 cc. water, and 0.5 g. $CaCO_3$ in place of the substrate in Example 1, and under the same conditions, a satisfactory yield of a penicillin is obtained in 4 days.

Example 4

A substrate composed of 50 g. oats, 1.5 g. $CaCO_3$, and 50 cc. water is prepared in a 250 cc. flask; and the flask is sterilized by autoclaving, inoculated with a spore suspension of a *Penicillium notatum* strain (Be) used for surface culture production, and incubated at 75° F. A maximum potency of 30 units/g. is developed in 5 days, the pH being 6.7. (If the flask is shaken after the third day to break up the substrate, a maximum potency of 48 units/g. is developed in 4 days, the pH being 6.8. The increased production is apparently due to the aeration effect of the shaking.)

Example 5

With 1 g. sodium citrate included in the substrate of Example 1, and under the same conditions, a maximum potency of 48 units/g. is developed in 11 days, the pH being 7.6.

Example 6

A substrate composed of 50 g. oats, 0.5 g. sodium citrate, 0.5 g. $CaCO_3$, and 50 cc. water is prepared in a 1 liter flask; and the flask is sterilized by autoclaving, inoculated with 5 cc. of a spore suspension of a *Penicillium notatum* strain (Be) used for surface culture production, and incubated at 75° F. A maximum potency of 36 units/g. is developed in 5 days, the pH being 6.8.

Example 7

Using a substrate composed of 50 g. oats, 3 g. $NaNO_3$, and 50 cc. water in place of the substrate in Example 6, and under the same conditions, a potency of 24 units/g. is developed in 4 days, the pH being 6.9, and a maximum potency of 48 units/g. is developed in 12 days, the pH being 6.9.

Example 8

Using a substrate composed of 50 g. oats, 1 g. sodium citrate, and 50 cc. water in place of the medium in Example 6, and under the same conditions, a maximum potency of 48 units/g. is developed in 8 days, the pH being 6.8.

Example 9

A substrate composed of 500 g. oats, 5 g. sodium citrate, 5 g. $CaCO_3$, and 500 cc. water is prepared in a 12 liter bottle; and the bottle is sterilized, inoculated with a spore suspension of a *Penicillium notatum* strain (Be) used for surface culture production, and incubated at 75° F.—the bottle being rotated about its (horizontal) axis during the incubation period, e. g., by placing it on electrically-driven rollers. A maximum potency of 48 units/g. is developed in 9 days, the pH being 6.6.

Example 10

Using a substrate composed of 500 g. oats, 30 g. $NaNO_3$, and 500 cc. water in place of the substrate in Example 9, and a spore suspension of deep-culture strain No. 832 of *Penicillium notatum* in place of the inoculum in that example, and under the same conditions, a maximum potency of 24 units/g. is developed in 9 days, the pH being 6.7.

Example 11

Using a substrate composed of 500 g. oats, 1 g. $Na_2SO_3$, and 500 cc. water in place of the substrate in Example 9, and under the same conditions, a maximum potency of 36 units/g. is developed in 7 days, the pH being 6.7.

The methods and media of this invention are utilizable for the production of penicillins and related antimicrobial agents by the growth of (suitable strains) of antimicrobial-agent-forming molds other than *Penicillium notatum*, inter alia, *Penicillium chrysogenum* and *Aspergillus flavus;* and the term "penicillin," as generically employed in the claims, is accordingly to be understood as embracing such related antimicrobial agents.

The invention may be variously otherwise embodied within the scope of the appended claims.

I claim:
1. The method of producing a penicillin which comprises sterilizing a solid substrate essentially comprising moist oats, sodium citrate, and calcium carbonate, and growing a penicillin-forming mold thereon.
2. The method of producing a penicillin which comprises sterilizing a solid substrate essentially comprising moist oats and sodium citrate, and growing a penicillin-forming mold thereon.
3. The method of producing a penicillin which comprises sterilizing a solid substrate essentially comprising moist oats and calcium carbonate, and growing a penicillin-forming mold thereon.

ROBERT E. McCORMACK.

REFERENCES CITED

The following references are of record in the file of this patent:

UNITED STATES PATENTS

| Number | Name | Date |
|---|---|---|
| 525,823 | Takamine | Sept. 11, 1894 |
| 1,148,938 | Takamine | Aug. 3, 1915 |
| 1,391,219 | Takamine | Sept. 20, 1921 |
| 1,460,736 | Takamine | July 3, 1923 |
| 2,291,009 | Underkofler | July 28, 1942 |
| 2,325,368 | Christensen | July 27, 1943 |
| 2,352,168 | Christensen | June 27, 1944 |

FOREIGN PATENTS

| Number | Country | Date |
|---|---|---|
| 579,937 | Great Britain | Aug. 21, 1946 |

OTHER REFERENCES

Clutterback et al., Biochem, Jr., 1932, page 1441.

Moyer et al., An Improved Method for the Production of Penicillin, Industrial-Engineering Chemistry, December 1943, page 5.

Coghill, Progress Report No. 14, September 6, 1943. Distributed by OSRD, pages 2 and 3.

Coghill, Progress Report No. 15, September 6, 1943, page 3.

Coghill, Chemistry and Industry, January 10, 1942, page 22.

Coghill, Progress Report No. 14, of record, page 1.

Thom, "The Penicillin," 1930, pages 118, 264, 265.